US012627060B2

(12) United States Patent
Navsariwala

(10) Patent No.: US 12,627,060 B2
(45) Date of Patent: May 12, 2026

(54) LOW-PROFILE ANTENNA FOR BELOW-GRADE APPLICATIONS

(71) Applicant: PCTEL, Inc., Bloomingdale, IL (US)

(72) Inventor: Umesh Navsariwala, Bartlett, IL (US)

(73) Assignee: PCTEL, INC., Bloomingdale, IL (US)

( * ) Notice: Subject to any disclaimer, the term of this patent is extended or adjusted under 35 U.S.C. 154(b) by 146 days.

(21) Appl. No.: 18/367,031

(22) Filed: Sep. 12, 2023

(65) Prior Publication Data

US 2024/0097338 A1 Mar. 21, 2024

Related U.S. Application Data

(60) Provisional application No. 63/406,893, filed on Sep. 15, 2022.

(51) Int. Cl.
*H01Q 9/04* (2006.01)
*H01Q 1/22* (2006.01)

(52) U.S. Cl.
CPC ........... *H01Q 9/045* (2013.01); *H01Q 1/2283* (2013.01)

(58) Field of Classification Search
CPC ........ H01Q 9/045; H01Q 1/2283; H01Q 9/40; H01Q 1/40; H01Q 1/2233; H01Q 1/04
See application file for complete search history.

(56) References Cited

U.S. PATENT DOCUMENTS 5,298,894 A 3/1994 Cerny et al.
5,583,492 A 12/1996 Nakanishi et al.
6,218,995 B1 * 4/2001 Higgins ................. G01D 4/002 343/719
7,202,828 B2 4/2007 Zehngut et al.
8,378,847 B2 2/2013 Bartram et al.
11,152,683 B2 10/2021 Azzinnari et al.
2009/0040117 A1 * 2/2009 Miyaura .................. H05K 1/16 343/702
2015/0236417 A1 * 8/2015 Iellci ...................... H01Q 5/328 343/700 MS
2018/0159208 A1 * 6/2018 Ameri .................... H01Q 21/28
2020/0185833 A1 * 6/2020 Azzinnari ................ H01Q 1/40

FOREIGN PATENT DOCUMENTS

JP 2009147611 A 7/2009

OTHER PUBLICATIONS

Extended European Search Report re application No. EP 23197004.7, dated Feb. 2, 2024.

* cited by examiner

*Primary Examiner* — Dieu Hien T Duong
(74) *Attorney, Agent, or Firm* — Husch Blackwell LLP

(57) ABSTRACT

A capacitively coupled below-grade antenna is provided. The antenna includes a housing; a cap detachable from the housing, the cap having a top surface; a feeding element coupled to a radio module; and a radiating element provided on the cap along the top surface such that the radiating element is capacitively coupled with the feeding element.

14 Claims, 7 Drawing Sheets

LOW-PROFILE ANTENNA FOR BELOW-GRADE APPLICATIONS

CROSS-REFERENCE TO RELATED APPLICATION

This application claims the benefit of the filing date of U.S. Provisional Application Ser. No. 63/406,893 filed Sep. 15, 2023, entitled, "Low-Profile Antenna For Below-Grade Applications", which is hereby incorporated by reference as if fully set forth herein.

TECHNICAL FIELD

This disclosure generally relates to an antenna. More specifically, this disclosure relates to a low-profile antenna suitable for below-grade applications.

BACKGROUND

In many applications where the device and radio are below-grade, such as underground or below ground level, it is challenging to get sufficient gain from an antenna to establish a communication link with a base station or access point.

For example, the radio could be part of a water meter that monitors water flow inside an underground vault or pit. Since the pit is underground and the pit and the lid covering the pit are typically metal, the pit and lid block all signals. As a result, the radio has to be connected to an antenna that is above ground level in order to establish a reliable communication link.

To address these issues, a typical practice is to use an antenna that is mounted remotely somewhere other than the radio. However, this type of solution is not practical in many scenarios, like walkways or pathways, where antennas are often located. There are, however, restrictions on the size of above-ground devices and antennas, especially when these are deployed on walkways or pathways.

In particular, there are several regulations that govern the height and size of the device, including the antenna, that can protrude above the level surface. For example, Americans with Disabilities Act (ADA) enforces a profile of the device above grade level that cannot exceed a certain profile and has to be less than ½ inch in height. Due to these restrictions, the antenna therein has an extremely small radiating volume or aperture, and consequently, the gain and bandwidth of the antenna are very low. In addition, there is a general need for aesthetic deployment, One approach has been to use an antenna, like a surface-mounted chip antenna on a printed circuit board assembly (PCBA) of the device as shown in FIGS. 1 and 2, with the antenna poking into the allowable above-grade volume.

In this type of device, an underground pit can include the underground device and with a lid over a pit. The underground device in the pit has a printed circuit board (PCB) with a radio coupled to the PCB. A chip antenna then extends upward from the radio PCB, poking through the lid and above ground.

In FIGS. 1 and 2, the chip antenna can be located in a housing of the device and a cap can be provided on the housing. The cap can be attached to the housing from the outside, and a nut (not shown) can be used on the inside to hold the cap in position. Thereby, the apparatus can be used with lids of various thicknesses and compositions. As mentioned before, these types of solutions, however, suffer from extremely small bandwidths, low efficiency, or both.

FIG. 3 illustrates antenna efficiency versus frequency of a chip antenna in various scenarios of materials for the lid and with or without a pit. The antenna efficiency represents the average of the signal strength from the antenna in all directions.

As shown in FIG. 3, there is a drop in antenna efficiency in the low-frequency band when the device is mounted on a metal lid placed on a metal pit. In particular, for frequencies between 824 MHz and 960 MHz (i.e., LTE Bands 5 and 8), this antenna shows a drop in efficiency of over 20 decibels (dB) in terms of signal strength as compared to a performance outside of the metal pit and lid. In terms of power, the drop of 20 dB would be 100 times less power. In most situations, this drop in efficiency would translate to a complete lack of a communication signal from the device to the base station or access point. Also as shown in FIG. 3, even with a composite lid placed on a metal pit, there is a substantial drop in efficiency or signal, e.g., about 10 dB.

Another approach that has been used with limited success is to change the lids of the vault or pit from a metal to a composite or plastic. While this solution does give some benefits over the previous solutions, it comes at a very high cost, both for the expensive composite lid as well as the labor and logistics involved in deploying these. There may also be additional concerns about maximum load handling limits for lids of larger sizes. Further, there is still a substantial drop in efficiency or signal with such an approach.

Another approach that has been attempted is to use antennas tuned to different bands to attempt to obtain better performance in a very specific band. Again, this has limited success and is an expensive solution as well from a logistical perspective.

Thus, there is a need for a low-profile antenna for below-grade applications with higher efficiency.

BRIEF SUMMARY

As described above, an antenna embedded inside the device has only a limited radiating volume in most installation scenarios and therefore does not provide a good signal quality for the communication link.

This disclosure pertains to a capacitively coupled antenna that can be deployed in the top cap used to secure the device. The advantage of the capacitively coupled antenna is that it maximizes the radiating volume of the antenna and thereby improves the antenna performance compared to an antenna that is mounted inside the meter device housing.

A first aspect of this disclosure pertains to a below-grade antenna including a feeding element coupled to a radio module, wherein the feeding element is provided at an end of the radio module; and wherein the feeding element extends along a first axis and the radio module extends along a second axis different from the first axis.

A second aspect of this disclosure pertains to the below-grade antenna of the first aspect further including a housing; and a cap detachable from the housing, the cap having a top surface.

A third aspect of this disclosure pertains to the below-grade antenna of the second aspect, wherein the first axis is substantially parallel to the top surface.

A fourth aspect of this disclosure pertains to the below-grade antenna of the first aspect, wherein the second axis is substantially perpendicular to the first axis.

A fifth aspect of this disclosure pertains to the below-grade antenna of the first aspect, wherein the feeding element is directly connected to the radio module at the end.

A sixth aspect of this disclosure pertains to the below-grade antenna of the fifth aspect, wherein the feeding element is directly connected to the radio module through solder.

A seventh aspect of this disclosure pertains to the below-grade antenna of the first aspect, wherein the radio module is coupled to the feeding element at a location proximal to a center of the feeding element.

An eighth aspect of this disclosure pertains to the below-grade antenna of the first aspect, wherein the feeding element is formed of a stamped metal part.

A ninth aspect of this disclosure pertains to the below-grade antenna of the second aspect further including a radiating element provided on the cap, wherein the radiating element is capacitively coupled with the feeding element.

A tenth aspect of this disclosure pertains to the below-grade antenna of the ninth aspect, wherein the radiating element is provided along the top surface of the cap.

An eleventh aspect of this disclosure pertains to the below-grade antenna of the ninth aspect, wherein the radiating element further includes a first surface that is substantially parallel with the feeding element.

A twelfth aspect of this disclosure pertains to the below-grade antenna of the eleventh aspect, wherein the radiating element further includes a second surface facing a different direction than the first surface.

A thirteenth aspect of this disclosure pertains to the below-grade antenna of the ninth aspect, wherein the radiating element is attachable to the cap.

A fourteenth aspect of this disclosure pertains to the below-grade antenna of the ninth aspect, wherein the radiating element is insert molded into the cap.

A fifteenth aspect of this disclosure pertains to the below-grade antenna of the ninth aspect, wherein the radiating element is provided along the top surface and a side surface of the cap.

A sixteenth aspect of this disclosure pertains to a below-grade antenna including a housing; a cap detachable from the housing, the cap having a top surface; a feeding element coupled to a radio module; and a radiating element provided on the cap, wherein the radiating element is capacitively coupled with the feeding element.

A seventeenth aspect of this disclosure pertains to the below-grade antenna of the sixteenth aspect, wherein the radiating element is provided along the top surface of the cap.

An eighteenth aspect of this disclosure pertains to the below-grade antenna of the sixteenth aspect, wherein the radiating element further includes a surface that is substantially parallel with the feeding element.

A nineteenth aspect of this disclosure pertains to the below-grade antenna of the sixteenth aspect, wherein the feeding element is provided at an end of the radio module; and wherein the feeding element extends along a first axis and the radio module extends along a second axis different from the first axis.

A twentieth aspect of this disclosure pertains to a below-grade antenna including a housing; a cap detachable from the housing, the cap having a top surface; a feeding element coupled to a radio module; and a radiating element provided on the cap along the top surface, wherein the radiating element is capacitively coupled with the feeding element, wherein the feeding element is provided at an end of the radio module; and wherein the feeding element extends along a first axis substantially parallel to the top surface, and the radio module extends along a second axis substantially perpendicular to the first axis.

Figure 1:
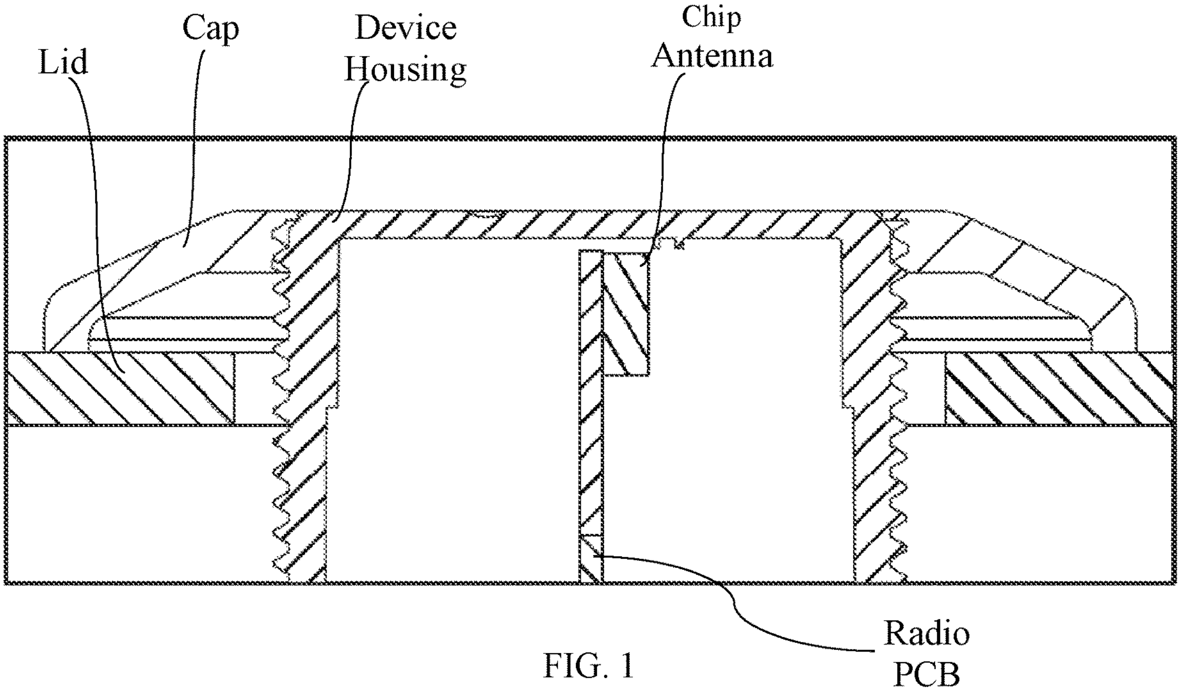
FIG. 1 (Prior Art)
FIG. 1 illustrates a cross-sectional view of an underground device with a chip antenna.

Before explaining the disclosed embodiment of this disclosure in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While subject disclosure is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

Figure 4:
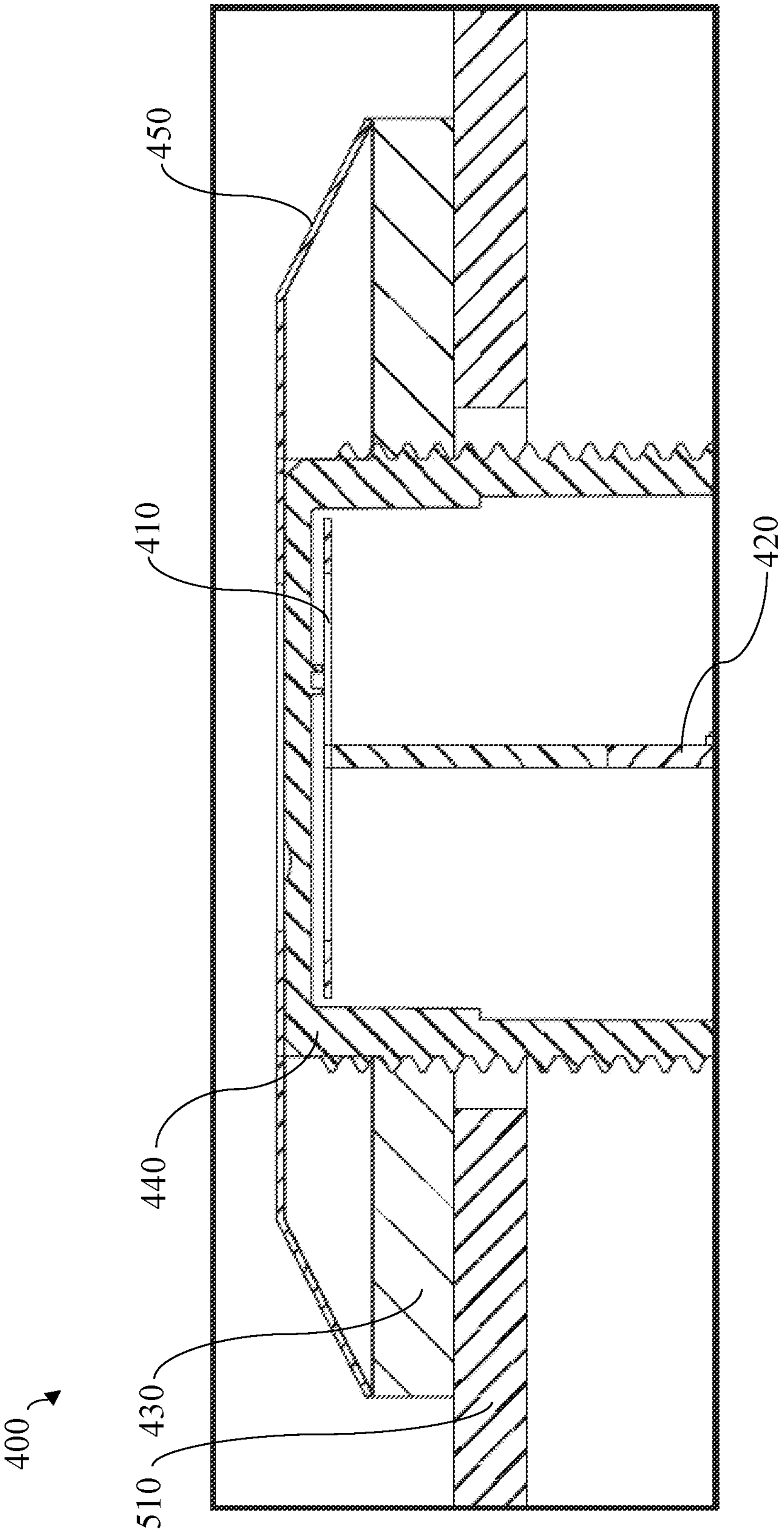
FIG. 4 illustrates a cross-sectional view of a capacitively coupled antenna according to an embodiment.

FIG. 4 illustrates a cross-sectional view of a capacitively coupled antenna 400 according to an embodiment. The antenna 400 includes a feeding element 410 that is connected to a radio module 420 which extends upwards from the underground device or meter.

The feeding element 410 can be a stamped metal part (copper, brass, etc.) and/or a flexible printed circuit with one or more copper layers. The feeding element 410 can be shaped to have a direct connection (such as solder) to the radio module 420.

The feeding element 410 can extend along a first axis and the radio module 420 can extend along a second axis. For example, the feeding element 410 be substantially parallel to a top surface of a cap 430 and be substantially perpendicular to the radio module 420, forming a "T" shape or a "L" shape, though the arrangement of the feeding element 410 relative to the radio module 420 may vary. In some embodiments, the radio module 420 can extend along a length of a device housing 440, and the feeding element 410 can extend along a width of the device housing 440. In a further embodiment, the feeding element and the radiating element are rotationally symmetric.

Although FIG. 4 illustrates the radio module 420 being coupled to the feeding element 410 at a location proximal to a center of the feeding element 410, in other embodiments, the feeding element 410 may be connected to the radio module 420 proximal to an end of the feeding element 410.

The device housing 440 can enclose the radio module 420. The cap 430 can be coupled to and cover the device housing 440. In an embodiment, the cap 430 can be screwed onto the top of the device housing 440 through one or more threads provided on an exterior of the device housing 440. The cap 430 can be made of a plastic material such as nylon or ABS, or other suitable materials.

A radiating element 450 can be provided in the cap 430, proximal to an outmost surface of the cap 430 (such as the top surface, the side surface, or the like). In an embodiment, the radiating element 450 can be provided on and/or along the top surface of the cap 430. The feeding element 410 can also have a substantial area along top and/or side surfaces to have an effective capacitance to be capacitively coupled with the radiating element 450. For example, a length of the feeding element 410 can span a substantial portion (such as about 95%) of a width of the device housing 440. It is noted that the capacitance is proportional to the area of overlap between the feeding and radiating elements and inversely proportional to the gap between them. For example, for an overlap area of 25 mm by 25 mm, a gap of 1 mm, and a material with permittivity of 3 in the gap, the effective capacitance is around 16 pF.

The radiating element 450 can be shaped to have a substantial area in proximity to the feeding element 410, thereby achieving the capacitive coupling. Once installed, the radiating element 450 can be in a close proximity to the feeding element 410 and thus can be excited by the feeding element 410.

The radiating element 450 can be a metallic component that is integrated into the cap 430, for example, by insert molding, adhesive attachment, screws, or some other mechanical means. The radiating element 450 can be made of materials resistant to the environment, such as stainless steel. Additionally or alternatively, a coating such as anodized aluminum can be provided over the radiating element 450. In embodiments where the radiating element 450 is insert molded into the cap 430, the radiating element 450 can include a thin layer of plastic over a top surface, further protecting the radiating element 450 from the environment.

In an embodiment, such as the one shown in FIG. 4, the radiating element 450 can have a frustoconical shape (such as having a tapered conical structure with a flat disc surface), it is to be appreciated that the radiating element 450 can be shaped in various shapes and geometries, and are within the scope of this disclosure. Moreover, slots and notches cut also be provided on the radiating element 450.

The radiating element 450 can extend downwardly along the sides of the cap 430. In some embodiments, the radiating element 450 may not extend all the way down the sides of the cap 430 to a lid 510 of a pit. In other embodiments, the radiating element 450 may extend down the sides of the cap 430 and contacts the lid 510. It is to be appreciated that sizes and shapes of the radiating element 450 can be modified to change an operating frequency of the antenna 400 depending on the specific application.

In some embodiments, the radiating element 450 can be provided external to the cap 430. For example, the radiating element 450 can be provided on top of, along the top of, and/or embedded in the top and/or the sides of the cap 430.

Because the radiating element 450 is provided at the outermost allowable surface that complies with regulatory standards like ADA, the antenna 400 can maximize the antenna volume and provides the best antenna efficiency and bandwidth. Additionally, due to the incrementally increased height of the antenna, the radiation in the horizontal plane can also be enhanced.

Figure 2:
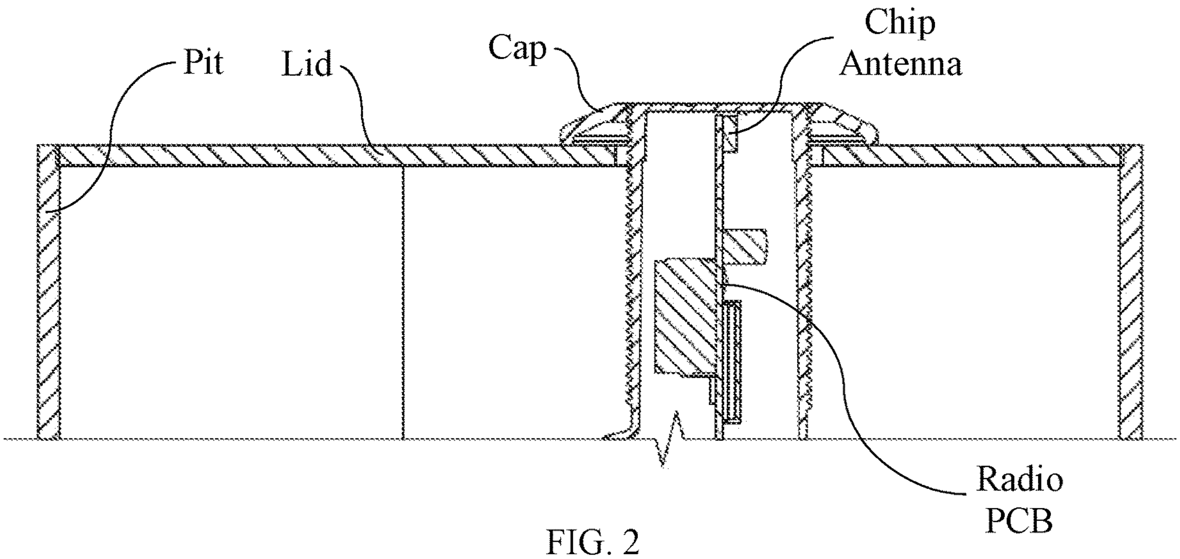
FIG. 2 (Prior Art)
FIG. 2 illustrates a cross-sectional expanded view of the underground device of FIG. 1 with the chip antenna showing the device in a pit.
Figure 3:
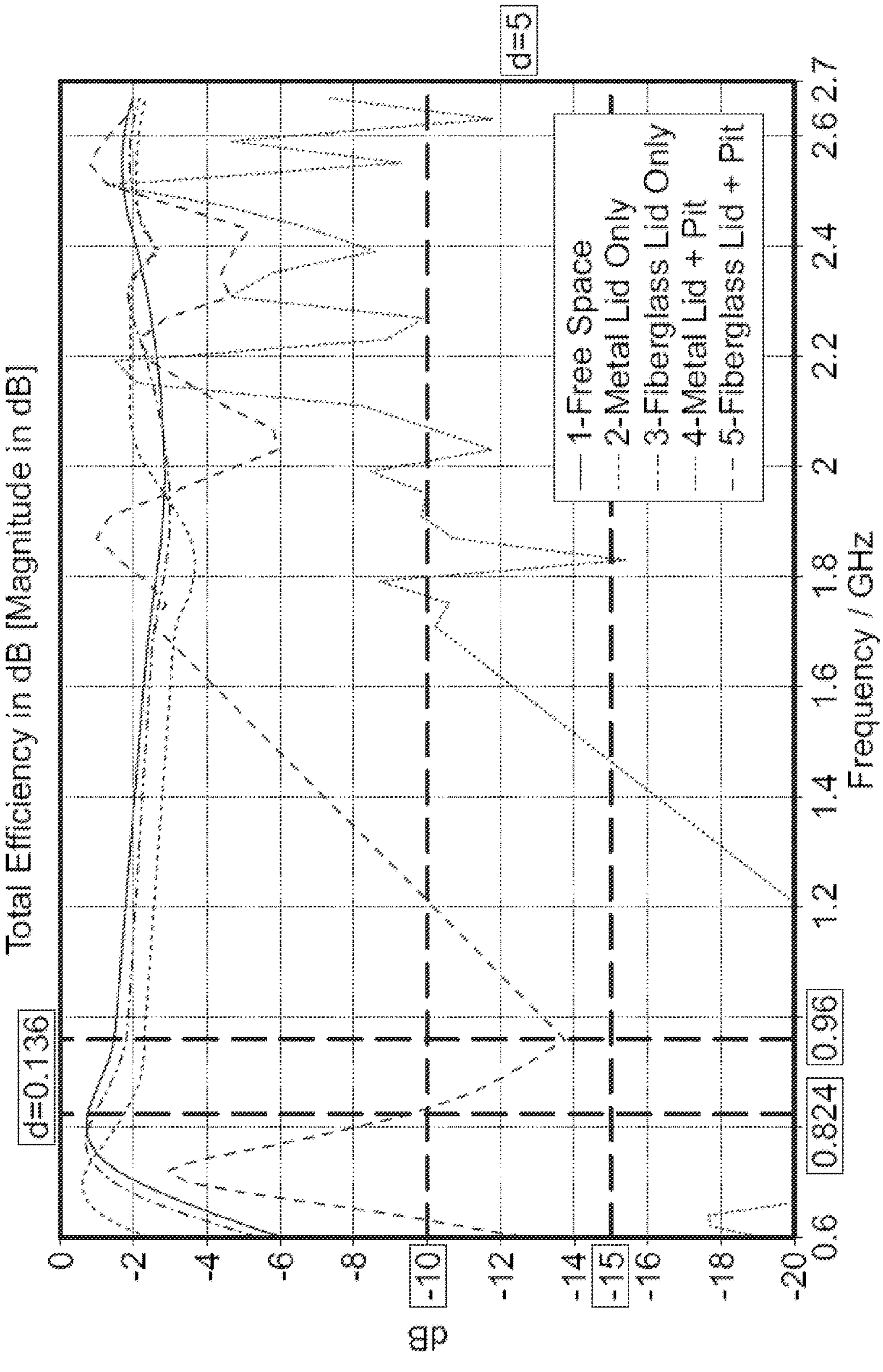
FIG. 3 (Prior Art)
FIG. 3 illustrates chip antenna efficiency versus frequency in various installation configurations.
Figure 5:
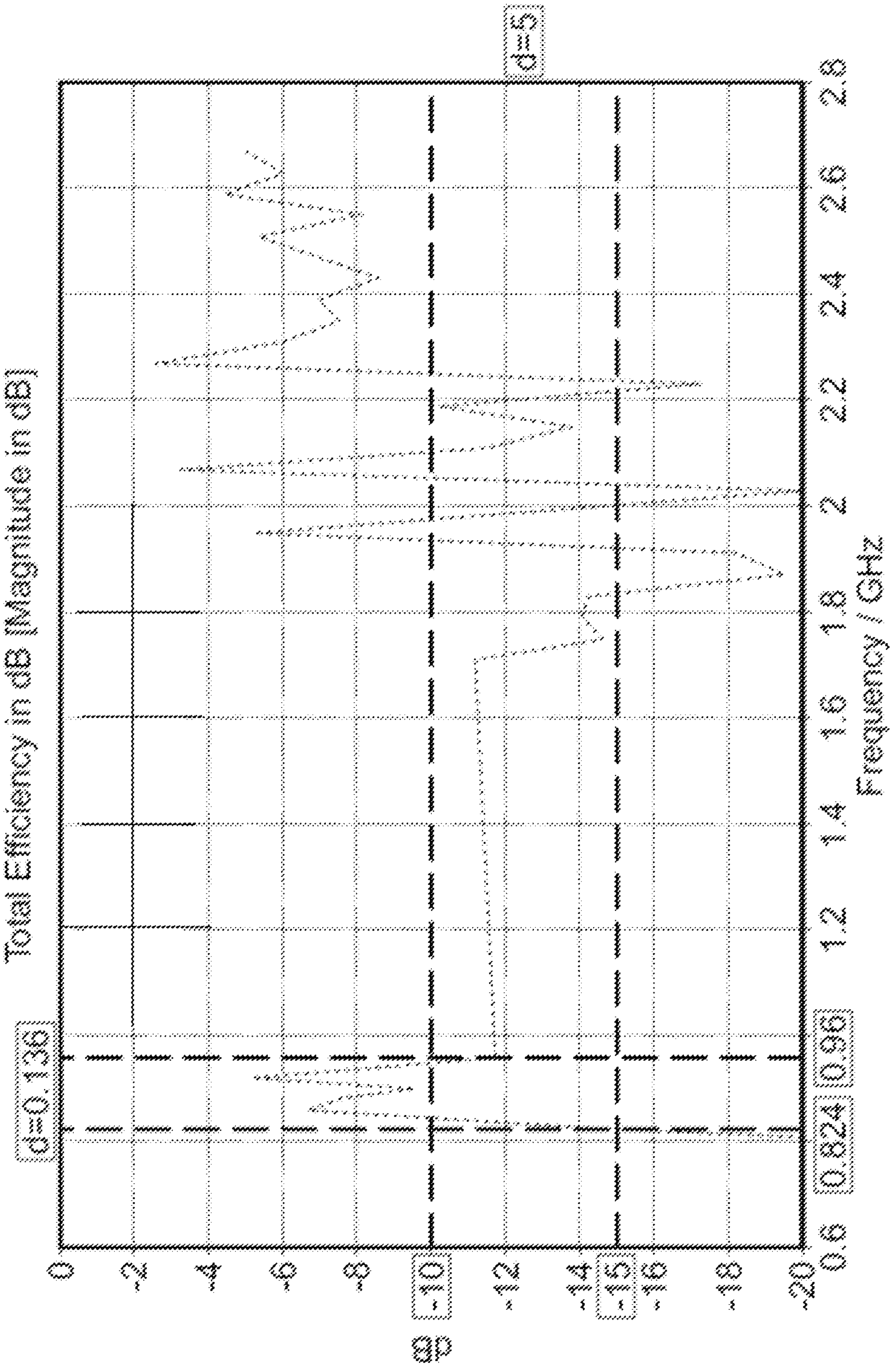
FIG. 5 illustrates antenna efficiency of the capacitively coupled antenna of FIG. 4.

FIG. 5 illustrates the antenna efficiency versus frequency when the antenna 400 is installed on a metal lid placed on a metal pit. In comparison to the chip antenna, such as those shown in FIGS. 1 and 2, the antenna efficiency of the antenna 400 is vastly improved.

In particular, for the low frequency bands between 824 MHz and 960 MHz, the antenna efficiency of the antenna 400 demonstrates a drop of only 4 dB to 12 dB compared to the 20 dB drop for the chip antenna. As a result, the antenna 400 demonstratively provides an acceptable level of performance and can be sufficient for a communication link in most situations between a meter radio from an underground device or meter and the base station or access point.

Figure 6:
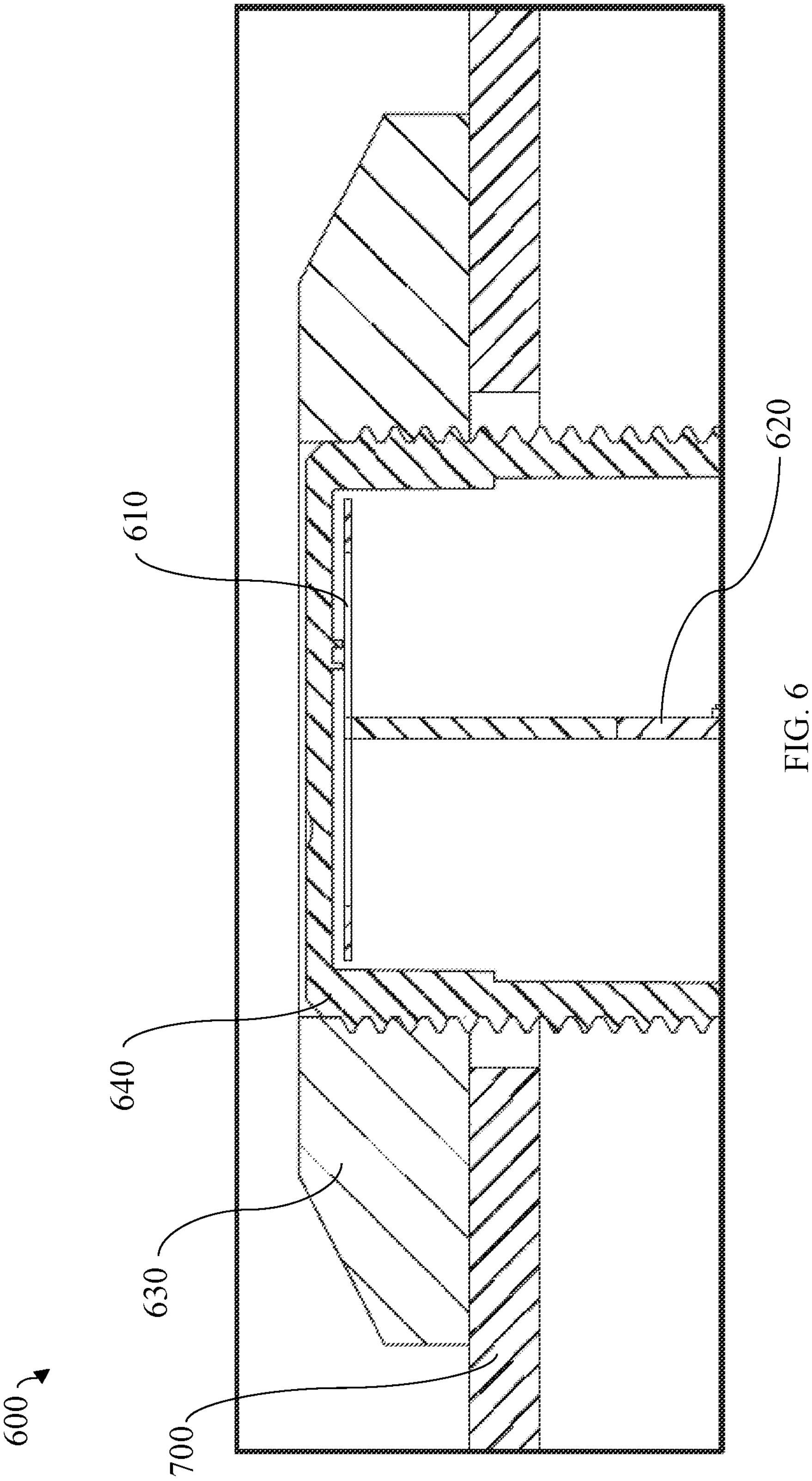
FIG. 6 illustrates a cross-sectional view of an antenna according to another embodiment.

FIG. 6 illustrates an antenna 600 according to another embodiment. As compared to the antenna 400 previously described, the antenna 600 does not include a capacitively coupled radiating element.

In this embodiment, the antenna 600 can include a standard cap 630 without a radiating element when a meter is installed on a composite or non-metallic lid 700. The cap 630 can be coupled or screwed on to a device housing 640.

Figure 7:
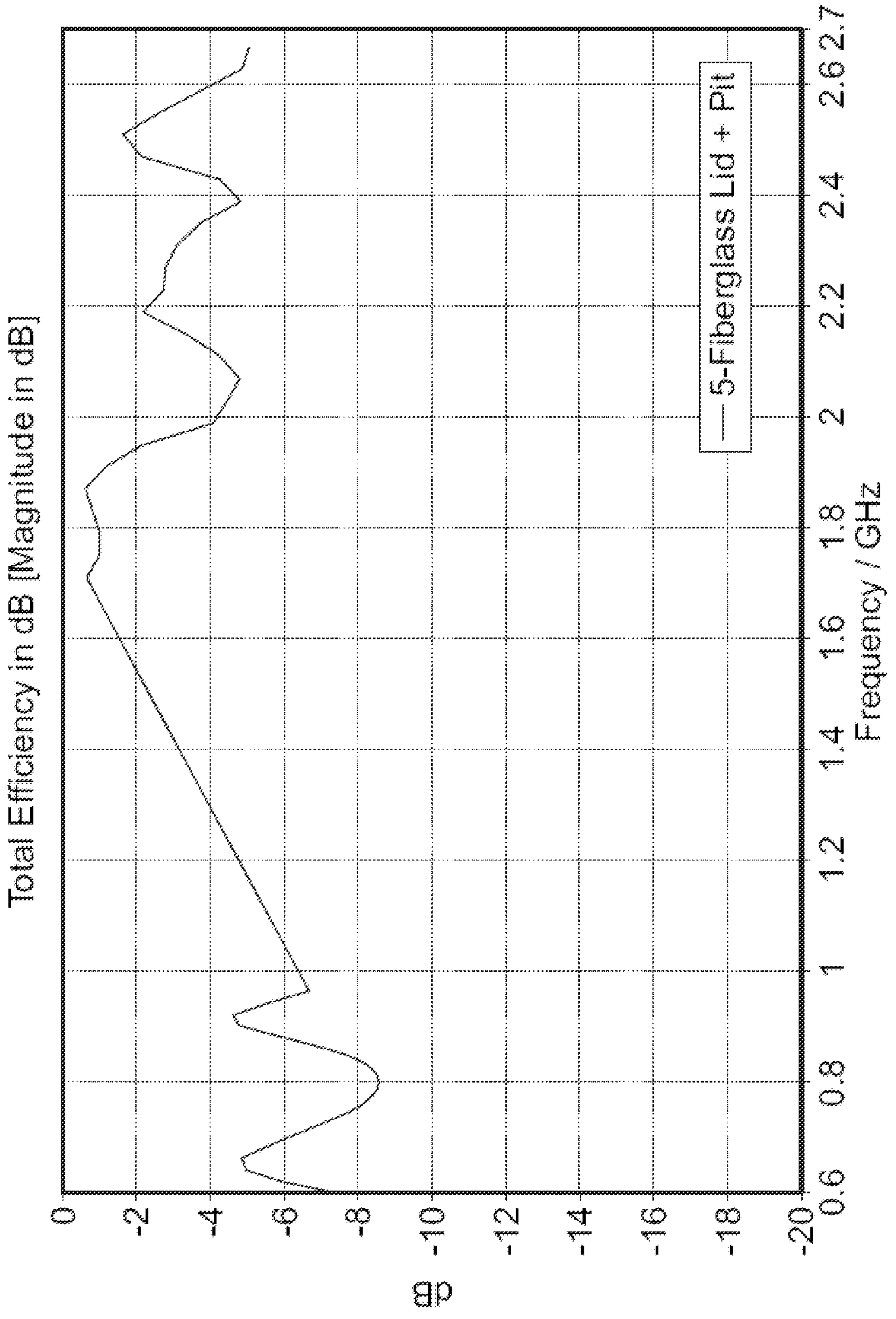
FIG. 7 illustrates antenna efficiency of the antenna of FIG. 6.

As shown in FIG. 7, the antenna efficiency of the antenna 600 is still acceptable, and a reasonable level of performance can be achieved to form a communication link between the meter and the base station or access point.

While the antenna 600 may share several structural similarities to a chip antenna, it is to be appreciated that a feeding element 610 of the antenna 600 functions as a radiating element without any other modifications. Moreover, the feeding element 610 can be connected to a radio module 620 similar to the feeding element 410 and the radio module 420 of the antenna 400.

It is also to be appreciated that other embodiments of the cap of antenna 400 can be realized such that the size and shape of the radiating element 405 in the cap can be modified to yield operation in other frequency bands without changing the radiating element 410 or the rest of the device 620 and 640.

Given the orientation and the dimension of the feeding element 610, which functions as a radiating antenna in the antenna 600, the performance of the antenna 600 is far superior to the traditional chip antenna where the chip antenna is typically much smaller and limited to the PCB. The improved antenna efficiency over the chip antenna is substantial in most installation scenarios, except when used in conjunction with a metal lid and metal pit. As such, the antenna 600 provides a significant advantage in the cost of the product, where a cap with a radiating element (i.e., the antenna 400) may only be needed for installations on a metal lid.

Specific embodiments of a low-profile antenna for below-grade applications according to this disclosure have been described for the purpose of illustrating the manner in which the invention can be made and used. It should be understood that the implementation of other variations and modifications of subject disclosure and its different aspects will be apparent to one skilled in the art, and that subject disclosure is not limited by the specific embodiments described. Features described in one embodiment can be implemented in other embodiments. The subject disclosure is understood to encompass this disclosure and any and all modifications, variations, or equivalents that fall within the spirit and scope of the basic underlying principles disclosed and claimed herein.

What is claimed is:

1. An antenna comprising:

a housing that is substantially below grade level;

a cap detachable from the housing, the cap having a top surface, the cap configured to be above grade level, wherein the cap comprises a radiating element, wherein the housing comprises a feeding element and a radio module, and wherein the radiating element is capacitively coupled with the feeding element.

2. The antenna of claim 1, wherein the feeding element extends along a first axis, the first axis is substantially parallel to the top surface.

3. The antenna of claim 1, wherein the radio module extends along a second axis, the second axis is substantially perpendicular to the first axis.

4. The antenna of claim 1, wherein the feeding element is provided at an end of the radio module, the feeding element is directly connected to the radio module at the end.

5. The antenna of claim 4, wherein the feeding element is directly connected to the radio module through solder.

6. The antenna of claim 1, wherein the radio module is coupled to the feeding element at a location proximal to a center of the feeding element.

7. The antenna of claim 1, wherein the feeding element is formed of a stamped metal part.

8. The antenna of claim 1, wherein the radiating element is provided along the top surface of the cap.

9. The antenna of claim 1, wherein the radiating element further comprising a first surface that is substantially parallel with the feeding element.

10. The antenna of claim 9, wherein the radiating element further comprising a second surface facing a different direction than the first surface.

11. The antenna of claim 1, wherein the radiating element is attachable to the cap.

12. The antenna of claim 1, wherein the radiating element is insert molded into the cap.

13. The antenna of claim 1, wherein the radiating element is provided along the top surface and a side surface of the cap.

14. A below-grade antenna comprising:

a housing;

a cap detachable from the housing, the cap having a top surface;

a feeding element coupled to a radio module; and a radiating element provided on the cap along the top surface, wherein the radiating element is capacitively coupled with the feeding element, wherein the feeding element is provided at an end of the radio module; and wherein the feeding element extends along a first axis substantially parallel to the top surface, and the radio module extends along a second axis substantially perpendicular to the first axis.

* * * * *